United States Patent

Yanagi

[11] Patent Number: 5,862,139
[45] Date of Patent: Jan. 19, 1999

[54] CODE-DIVISION-MULTIPLE-ACCESS (CDMA) RECEIVER AND METHOD WITH DC COMPONENT REMOVAL

[75] Inventor: Shuzo Yanagi, Tokyo, Japan

[73] Assignee: NEC Corporation, Tokyo, Japan

[21] Appl. No.: 753,496

[22] Filed: Nov. 26, 1996

[30] Foreign Application Priority Data

Dec. 6, 1995 [JP] Japan ................................. 7-316995

[51] Int. Cl.$^6$ ....................................................... H04J 13/02
[52] U.S. Cl. ........................... 370/441; 370/479; 375/350
[58] Field of Search .................................. 370/320, 335, 370/342, 441; 375/205, 206, 200, 201, 202, 203, 204, 208, 207, 209, 210, 285, 317, 319, 350, 345, 346, 340; 327/307, 306, 309, 310, 311, 312, 313, 315, 316, 318, 323, 324, 329, 331, 332; 329/318, 319, 320, 321

[56] References Cited

U.S. PATENT DOCUMENTS 5,150,377 9/1992 Vannucci ................................. 375/206
5,640,416 6/1997 Chalmers ................................. 375/350

FOREIGN PATENT DOCUMENTS 247911 2/1990 Japan .

Primary Examiner—Huy D. Vu
Attorney, Agent, or Firm—McGinn & Gibb, P.C.

[57] ABSTRACT

A receiver removes a direct current (DC) offset component from a received Code Division Multiple Access (CDMA) spread spectrum signal. The DC offset is attributed to both spreading code imbalance as well as conversion between analog and digital formats. In operation, received data is de-spread using an appropriate de-spreading code. Thereafter, a DC offset removing circuit employs a positive/negative counter counting each occurrence of positive and negative chips to produce a chip imbalance for each chip in the spreading code. The measured imbalance is multiplied by the received data signal, an RF component of this multiplied output is removed by a low-pass filter, and thereafter, the signal is again multiplied by the chip imbalance. The DC offset components in the received signal are removed by subtracting the second multiplied signal from the received data signal.

20 Claims, 5 Drawing Sheets

CODE-DIVISION-MULTIPLE-ACCESS (CDMA) RECEIVER AND METHOD WITH DC COMPONENT REMOVAL

BACKGROUND OF THE INVENTION

1. Field of the Invention

The present invention generally relates to a method and Code-Division-Multiple-Access (CDMA) receiver for a mobile communication system and, more particularly, to a method and CDMA receiver for removing a direct current (DC) component from a received CDMA signal.

2. Description of the Prior Art

Presently, Code-Division-Multiple-Access (CDMA) communication is widely used in mobile communication systems. CDMA refers to a type of radio communication using a spread-spectrum technique.

In operation, a transmitter modulates data with a spreading code sequence into a spread data, which is transmitted over a radio frequency (RF) link. In order to recover the data, the receiver must de-spread the spread data by using the same spreading code sequence as used by the transmitter.

The spreading code sequence comprises strings of bits (typically referred to as "chips") which are multiplied with the data bits prior to transmission. Various spreading code sequences are known, such as, for example, Maximum Length Code or Maximum Length Sequence series, sometimes referred to simply as "M series" as well as "Gold code series". Ideally, a spreading code sequence should be balanced in its repetition period. That is, the occurrence of a positive chip "+1" should be substantially equal to that of a negative chip "−1" in the repetition period of the spreading code sequence. Generally, one symbol is equal to one bit, with the chip being the time interval of the spreading code. It is noted that logical values "1" and "0" of the signal line 22 in FIG. 4 represent the positive chip "+1" and the negative chip "−1", respectively.

If the spreading code is not balanced, the received signal will include a direct current (DC) offset component having an amplitude corresponding to the imbalance. This is problematic and will cause faulty communications. A typical value of the DC offset is within a predetermined range of normally 2% of the received signal power based on design specifications and on degradation caused by the system.

FIG. 5 is a schematic block diagram for showing an example of a conventional CDMA receiver described in Japanese Laid-Open Patent Application No. 2-47911.

The receiver comprises an antenna 11 for receiving a transmitted signal from a CDMA transmitter (not shown), a quasi-sync detecting circuit 12 for converting this received signal into a baseband signal, and a capacitor 19 for removing a DC component from the baseband signal.

The receiver further comprises an analog-to-digital (A/D) converter 13 for converting a signal from which the DC component has been removed into digital data, a de-spreading code generating circuit 16 for generating a de-spreading code identical to the spreading code sequence used by the transmitter, a de-spreading circuit 14 for de-spreading the digital data by employing the de-spreading code, and also a clock generating circuit 17 for generating a clock required in the respective portions of the receiver. The code sequence generated by circuit 16 is a fixed periodical sequence for each channel. Preferably, the period of the code sequence is equal to one symbol time of the transmitted data. However, the period of the code sequence may be longer than one symbol time.

With this arrangement, the RF signal received by the antenna 11 is input into the quasi-sync detecting circuit 12 to be converted into a baseband signal. After the DC component of this baseband signal has been removed by the capacitor 19, the resultant baseband signal is input into the A/D converter 13 and converted into a digital signal. The output signal 23 of the A/D converter 13 is a baseband signal based on the digital signal, and this output signal is inputted into the de-spreading circuit 14 in order to be de-spread. In this case, the output signal 23 is de-spread by utilizing a replica of the spreading code produced from the de-spreading code generating circuit 16. The reception data is outputted from the circuit by this de-spreading process.

A problem of the conventional CDMA receiver of FIG. 5 is that, since the DC component is removed by the capacitor 19 prior to the A/D converter, any DC offset contributed to the signal by the A/D converter 13 cannot be removed.

Another problem is that any DC component which is actually part of the original signal and should therefore be included in the recovered signal is also removed, resulting in signal deterioration.

Referring now to FIG. 6, there is shown a block diagram of a second example of a conventional CDMA receiver. Equivalent parts to those of FIG. 5 are indicated by the like reference numerals for simplicity.

A major difference between the receiver shown in FIG. 5 and that shown in FIG. 6 is that FIG. 6 receiver does not require the capacitor 19, but instead includes a DC offset removing circuit 18 which removes the DC component from signal 23 after the A/D-converter 13 has converted the analog signal into a digital signal. Thereafter, the signal is de-spread by circuit 14 as before.

In this arrangement, the RF signal received by the antenna 11 is inputted into the quasi-sync detecting circuit 12 to be converted into a baseband signal. The baseband signal is inputted into the A/D converter 13 and is converted into a digital baseband signal. The digital baseband signal 23 which is output from the A/D converter 13 is input to the DC offset removing circuit 18, so that the DC offset component is removed. Then, the DC-free signal is input into the de-spreading circuit 14 to be de-spread. In this case, this signal is de-spread by using a replica 22 of the spreading code sequence generated in the de-spreading code generating circuit 16. The reception data is outputted by this de-spreading operation symbol-by-symbol.

Referring to FIG. 7, the DC offset removing circuit 18 shown in FIG. 6 is explained in greater detail. The DC offset removing circuit 18 comprises a low-pass filter (LPF) 25 for removing a signal component other than the DC component, and an adder 27 for inverting this removed signal and for adding the inverted signal to the signal 23.

With this arrangement, the digital baseband signal 23 outputted from the A/D converter 13 is inputted, via the adder 27, to the low-pass filter 25. The output of the adder is a DC-offset suppressed signal. With the LPF 25, the signal components other than the DC component are removed from the output of the adder 27. The output signal of the LPF 25 becomes a predicted value of the DC drift included in the digital baseband signal, and this predicted value is inverted and then inputted to the adder 27. As a result, the signal from which the DC offset component has been removed is outputted from the adder 27. It is noted that FIG. 7 substantially illustrates a high-pass filter.

The conventional CDMA receiver of FIG. 6 has several problems. First, this receiver has increased power consumption due to the additional DC offset removing circuit.

Specifically, the DC offset component is removed from the signal before the de-spreading operation is performed, and therefore the clock corresponding to the chip rate of the spreading code sequence must initiate the DC offset removing circuit. Thus, the additional semiconductor elements of the DC offset removing circuit operate at high speed, thereby increasing power consumption.

Another drawback is that when the spreading codes are varied in each symbol of the data. Namely, when the repetition of the spreading code sequence is longer than a data interval, the DC offset component cannot be removed correctly, because the DC offset component varies data-by-data.

Particularly, when the code sequence whose repetition period is long relative to a symbol period of the transmitted data (e.g., much longer than the data symbol period) and this spreading code sequence is changed data-by-data, the DC offset component produced in response to the code balance (or imbalance) of the spreading code sequence being used is changed received data-by-received data. Then, the DC offset component is insufficiently removed in the conventional DC offset circuit, shown in FIG. 7, for removing the predicted DC offset component.

SUMMARY OF THE INVENTION

In view of the foregoing problems of the conventional CDMA receivers, an object of the present invention is to provide a method and CDMA receiver having a relatively lower power consumption.

Another object of the present invention is to provide a CDMA receiver and method for effectively and efficiently removing an undesired DC offset component from a received CDMA signal.

In a first aspect according to the present invention, a CDMA receiving apparatus for de-spreading received CDMA data includes a de-spreading circuit for de-spreading the received CDMA data, and an offset removing circuit for removing a DC offset from the data introduced by a code characteristic of the spreading and de-spreading code sequence. Preferably, the code characteristic comprises an imbalance of the code.

In operation, the CDMA receiver first de-spreads the received signal and then the DC offset is removed in accordance with-the code balance (or imbalance) of the de-spreading code sequence. The DC offset is removed depending upon the amount of imbalance in the code sequence as follows.

First, the code balance of the de-spreading code sequence is measured, and the measured code balance is multiplied by the received signal after being de-spread, to produce a first product. The high frequency components of the first product are removed by a low-pass filter, and the resultant signal is multiplied by the measured code balance, to produce a second product. The second product is subtracted from the de-spread reception signal, thereby effectively and efficiently removing the offset.

The code balance of the de-spreading code sequence is measured as follows. The "+1" and "1" chips of the spreading codes sequence are counted respectively in synchronism with the clock equivalent to the chip rate of the spreading code. Then, a difference between these count values for each symbol of data is used as the measurement result.

In a second aspect of the invention, a method is provided for removing a direct current (DC) offset from received data transmitted by a spread-spectrum technique, which includes calculating a chip imbalance from a de-spreading code for each data; multiplying the received data by the imbalance to modify the received signal according to a first DC offset attributed to an imbalance of the de-spreading codes in each data; removing a high frequency component from the received data; multiplying the received data, after removing the high frequency component, by the imbalance to modify the received signal according to a second DC offset, to produce a feed-back signal; and subtracting the feed-back signal from the received data to produce a data signal free of the first DC offset and the second DC offset.

With the unique and unobvious method and structure of the present invention, any DC offset contributed to the signal by an A/D converter can be removed. Further, any DC component which is actually part of the original signal is not removed and thus is included in the recovered signal, thereby maintaining signal quality.

Further, with the invention, power consumption is not increased, and even when the spreading codes are varied data-by-data, the DC offset component can be correctly removed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
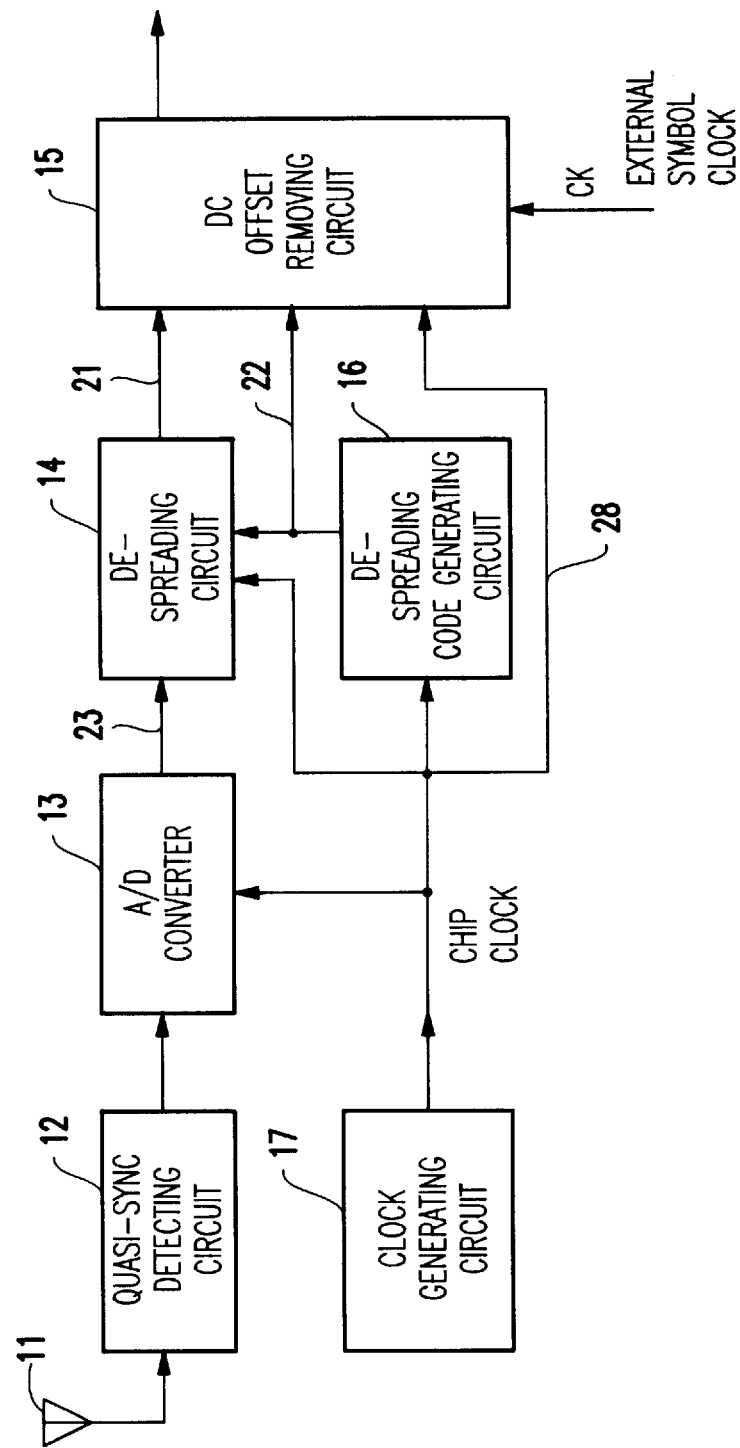
FIG. 1 is a block diagram for the CDMA receiving apparatus according to the present invention.
Figure 5:
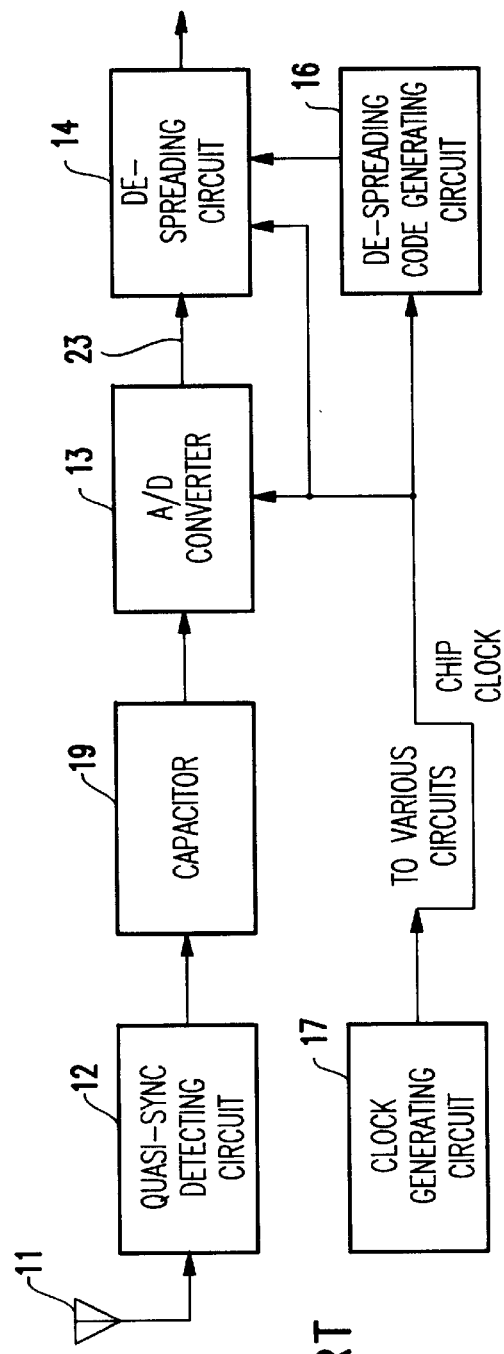
FIG. 5 is a block diagram for showing an example of a conventional CDMA receiving apparatus.

Referring now to the drawings, and more particularly to FIG. 1, an arrangement of a CDMA receiver is shown according to the present invention. For simplicity and brevity, similar portions of FIGS. 5 and 6 are indicated by like reference numerals.

Figure 6:
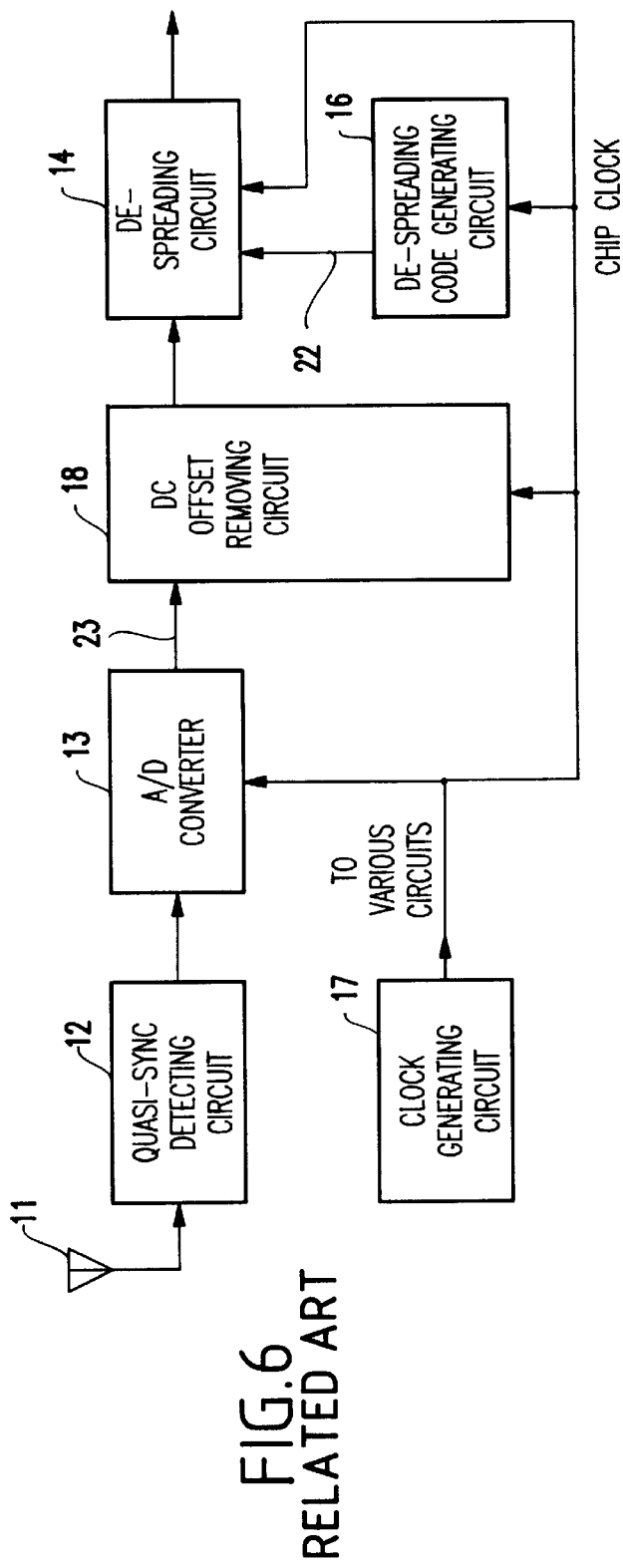
FIG. 6 is a block diagram showing another example of a conventional CDMA receiving apparatus.
Figure 7:
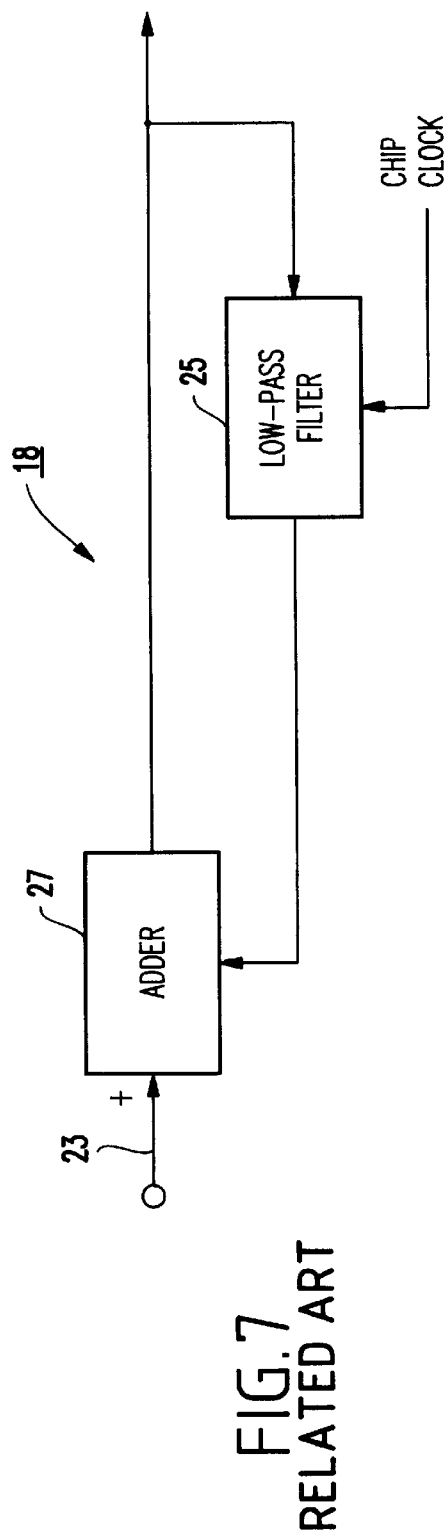
FIG. 7 is a block diagram of the DC offset removing circuit shown in FIG. 6.

In FIG. 1, the CDMA receiver differs from that shown in FIG. 6 in that the invention comprises a DC offset removing circuit 15 for removing a DC offset after the de-spreading operation by a de-spreading circuit 14. Thus, the DC offset removing circuit is positioned downstream of the de-spreading circuit 14. Further, a clock generating circuit 17 generates a chip clock to the A/D converter 13, the de-spreading circuit 14, the de-spreading code generating circuit and the DC offset removing circuit 15. The chip clock is generated in accordance with received data. An external symbol clock is generated and provided to the DC offset removing circuit 15 in synchronism with received data.

In this arrangement, the RF signal received by the reception antenna 11 is inputted into the quasi-sync detecting circuit 12 so as to be converted into the baseband signal. This baseband signal is inputted into the A/D converter 13, so as to be converted into the digital signal. The digital baseband signal 23 outputted from the AID converter 13 is inputted into the de-spreading circuit 14 to be de-spread. Thus, the digital baseband signal is de-spread by using a replica of a spreading code sequence, which is generated by the de-spreading code generating circuit 16. The repetition period of the spreading code is preferably "N", where "N" is an integer equal to 2 or larger, times longer than a time equal to one chip of the spreading code. For example, the time equal to one chip of the spreading code may be 128. Additionally, as mentioned above, the chip clock is generated in accordance with received data. The external symbol clock has a lower frequency (e.g., approximately 10 Khz) than the chip clock. For example, the chip clock has a frequency of approximately 1 MHZ.

A signal 21, de-spread by the de-spreading circuit 14, is inputted into the DC offset removing circuit 15, so as to remove a DC offset component. Thereafter, the signal whose DC offset component has been removed is outputted. Preferably, the DC offset component is removed by using the replica 22 of the spreading code sequence generated in the de-spreading code generating circuit 16.

On the other hand, the digital baseband signal which has been A/D-converted by the A/D converter 13 contains a DC offset component produced during the A/D converting operation by the A/D converter 13. Consequently, the signal which has been de-spread by the de-spreading circuit 14 contains a DC offset component caused by a code characteristic.

Specifically, the code characteristic comprises an imbalance of the code. Thus, the DC offset component is caused by an imbalance of the spreading code, as well as another DC offset component caused by a digital-to-analog (D/A) converting operation in the transmitter, and another DC offset component caused by the A/D converting operation in the receiver.

If a repetition period of a spreading code length is longer than time corresponding to one symbol of the data, then the code balance of the spreading code is varied in each data interval, if the spreading code sequence itself is balanced in its repetition period.

As a result, when the repetition period of the spreading code length is longer than this time, the DC offset component contained in the reception signal does not represent a constant value.

Figure 2A:
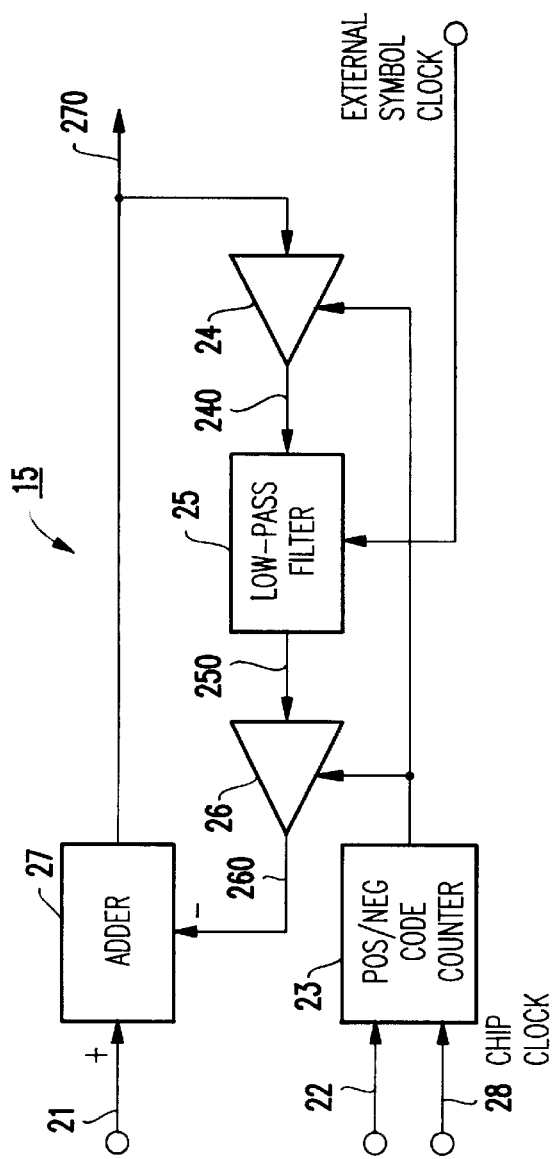
FIG. 2A is a block diagram showing an example of an internal arrangement of the DC offset removing circuit in FIG. 1.

Hereinafter, the internal arrangement of the DC offset removing circuit 15, shown in FIG. 1, is described with reference to FIG. 2A. Circuit portions similar to those of FIG. 1 are indicated by like reference numerals. In FIG. 2A, the DC offset removing circuit 15 comprises multipliers (e.g., amplifiers) 24 and 26 provided on the input side of a low-pass filter (LPF) 25 as well as on the output side. Preferably, the multipliers may have any of a number of known structures. The cutoff frequency is preferably less than half of the symbol frequency. For example, with a symbol frequency of 10 Khz, the LPF 25 preferably would have a cutoff frequency of 5 Khz. The LPF preferably does not pass frequencies more than one-half the symbol clock frequency. It is even more preferable if the LPF has a narrow passband as possible. For example, while an LPF with a 1-Hz passband is difficult to fabricate, such an LPF with this passband would be advantageous.

A positive/negative code counter 23 is included for outputting a difference between a positive code "+1" of a spreading code and a negative code "−1" every 1 symbol of the transmitted data and for entering the difference to the multipliers 24 and 26. The counter 23 is preferably implemented with the structure of FIG. 4.

In this arrangement, the replica 22 of the spreading code sequence outputted from the de-spreading code generating circuit 16 is inputted into the positive/negative code counter 23. The positive/negative code counter 23 counts the difference between the positive code "+1" of the spreading code and the negative code "−1" for every symbol, and outputs this counted difference. In other words, the positive/negative code counter 23 measures keeps a running count of the code balance for every symbol.

The signal 21, de-spread by the de-spreading circuit 14, is inputted into the multiplier 24, so as to be multiplied by the output of the positive/negative code counter 23. Thus, a weighting process is performed based on the positive/negative code difference in every symbol.

By performing this weighting process, an output signal 240 for minimizing the DC offset component caused by the code unbalance of the spreading codes is outputted from the multiplier 24.

The output signal 240 from the multiplier 24 is inputted to the low-pass filter 25, so as to remove components other than the DC frequency due to the A/D conversion.

As a result, an output signal 250 of the low-pass filter 25 becomes a predicted value of the DC offset component before the DC offset component was de-spread. This predicted value is inputted into the multiplier 26, thereby to be multiplied by the output of the positive/negative code counter 23. Accordingly, an output signal 260 of the multiplier 26 becomes a predicted value of the DC offset component contained in each of symbols after being de-spread.

The output signal 260 of the multiplier 26 is inputted to an inverting input terminal of the adder 27. As a result, such a signal 270 is outputted from the adder 27, which is produced by subtracting the output signal 260 of the multiplier 26 from the signal 21 which is de-spread by the de-spreading circuit 14 and is inputted into the non-inverting input signal terminal. The output signal 270 of adder 27 corresponds to a signal from which the DC offset components contained in the respective symbols after being de-spread have been removed.

Figure 2B:
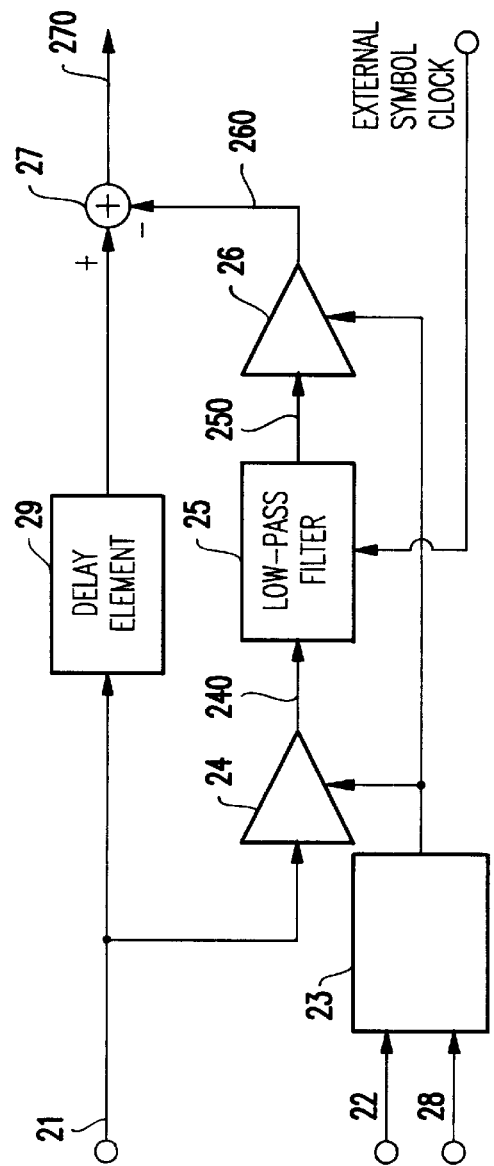
FIG. 2B is a block diagram showing a second example of the internal arrangement of the DC offset removing circuit in FIG. 1.

Alternatively to the structure of FIG. 2A, the internal arrangement of the DC offset removing circuit 15 of FIG. 1 could be implemented as shown in FIG. 2B. It is noted that the structure of FIG. 2B is substantially similar to that of FIG. 2A and like reference numerals are used for brevity and simplicity.

A key difference between the embodiment of the DC offset removing circuit of FIG. 2A and that of FIG. 2B is that the embodiment of FIG. 2A includes a feedback loop from the output of the adder 27 through multiplying and low-pass filtering circuitry and back to an inverting input terminal of the adder 27. In contrast, the embodiment of FIG. 2B includes a feed-forward loop from the input of signal 21 to multiplying and low-pass filtering circuitry to an inverting input terminal of the adder 27. Thus, the second embodiment of the DC offset removing circuit includes a delay element 29 positioned upstream from the adder 27. Delay elements are well-known to those of ordinary skill in the art, and thus the structure of the delay element 29 will not be described in detail here. The delay element 29 is provided for timing synchronism with for the inputs to the inverting, and non-inverting, terminals of the adder 27 because the input signal 21 is branched to the first multiplier 24 and is processed through the low-pass filter 25 and multiplier 26 before being applied to the inverting input terminal of the adder 27. Thus, the adder 27 receives inputs at its non-inverting and inverting terminals at substantially the same time. Other than the inclusion of the delay element 29 and the feed-forward loop, the operation of this embodiment is similar to that described above (and below) with regard to the structure of FIG. 2A.

Figure 3:
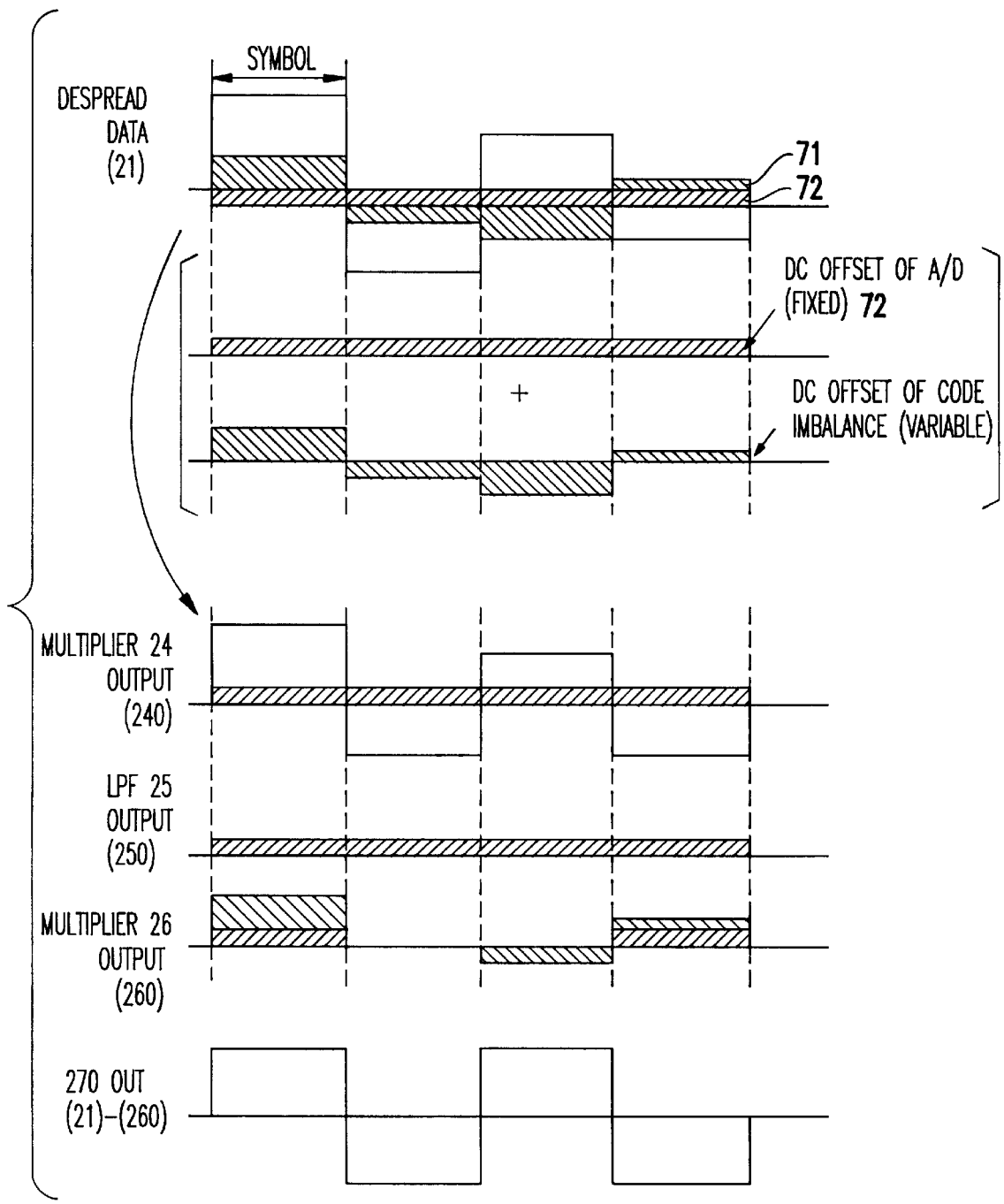
FIG. 3 illustrates exemplary waveforms of signals appearing in various circuit portions of FIG. 2A.

FIG. 3 is a diagram representing the signals appearing at various portions in the circuit of FIG. 2A. First, in FIG. 3, there is shown the de-spread data signal 21 input into the non-inverting input terminal of the adder. As indicated in FIG. 3, the de-spread data signal 21 contains a DC offset component 71 caused by the unbalanced spreading code, and another DC offset component 72 caused by the A/D conversion and the D/A conversion. The DC offset due to the code imbalance is generally variable depending upon whether the code sequence varies symbol-by-symbol. The DC offset of the A/D conversion (and the D/A conversion) is generally fixed and is due to the hardware used by the system.

As further shown in FIG. 3, the signal 21 is inputted into the multiplier 24 to be multiplied by the output from the positive/negative code counter 23. Consequently, the DC offset component 71 caused by the imbalance of the spreading code can be removed. Therefore, as indicated in FIG. 3, the output signal 240 of the multiplier 24 contains the DC offset component 72 caused by the A/D conversion and the D/A conversion in addition to the reception signal.

The output signal 240 of the multiplier 24 is inputted to the low-pass filter 25 so as to "cut off" the RF component. Specifically, the low-pass filter passes only signals less than or equal to the cut-off frequency. Signals with frequencies above the cut-off frequency are cut-off and not passed.

Accordingly, as shown in FIG. 3, the output signal 250 of the low-pass filter 25 contains only the DC offset component 72 caused by the A/D conversion and the D/A conversion, namely only the DC offset component before being de-spread (e.g., as mentioned above, this is a fixed DC offset component arising from and inherent to the structure of the A/D or D/A converter).

The output signal 250 of the low-pass filter 25 is inputted into the multiplier 26 so as to be multiplied by the output of the positive/negative code counter 23. As a result, as indicated in FIG. 3, the output signal 260 of the multiplier 26 contains the DC offset component 71 caused by the imbalance of the spreading code, and the DC offset component 72 caused by the A/D conversion and the D/A conversion. At this time, the value of the DC offset component 71 is varied for every symbol.

The output signal 260 of the multiplier 26 is inputted to the inverting (−) input terminal of the adder 27, so that the output signal 260 is subtracted from the signal 21 input to the non-inverting (+) input signal terminal thereof. As shown in FIG. 3, the output signal 270 corresponding to this subtraction result is a signal in which the DC offset component contained in the respective symbols has been removed after the de-spreading operation.

Figure 4:
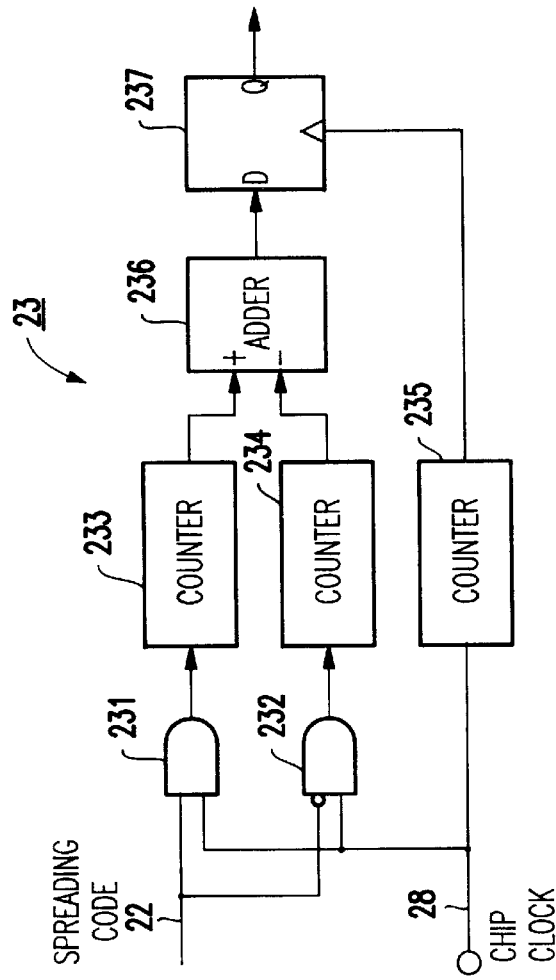
FIG. 4 is a block diagram showing a positive/negative code counter of FIG. 2A.

Referring now to FIG. 4, an internal arrangement of the positive/negative code counter 23 is shown. As shown in FIG. 4, the positive/negative code counter 23 includes a chip clock 28 for outputting chip clocks. AND gates 231 and 232 are provided, each having one input terminal connected to receive the chip clock signal. Additionally, a counter 233 for counting up in response to an output of the AND gate 231 and another counter 234 for counting up in response to an output from the AND gate 232 are provided.

Also, the positive/negative counter 23 includes a counter 235, coupled to receive chip clocks 28, for counting up in response to the chip clock 28 to thereby output "1" corresponding to each one symbol of the received data. Thus, every time the count value in the counter 235 reaches "N", the counter 235 outputs "1". An adder 236 calculates a difference (e.g., subtracts or performs a subtractor function) between the count value of the counter 233 and the count value of the counter 234.

The output of the adder 236 is input to a data input of a D-type flip-flop 237 which is clocked by the counter 235. With this arrangement, the chip clock equivalent to the chip rate of the spreading code is inputted to the counter 235.

The counter 235 executes the counting operation in response to this clock, and outputs "1" every time corresponding to one symbol of the received data (e.g., when "N" is reached). This output is inputted to the clock terminal of the D-type flip-flop 237.

On the other hand, the replica 22 of the spreading code is inputted to the input terminal of the AND gate 231, and also into the inverting input terminal of the AND gate 232. The clock from the clock oscillator 230 is entered into another input terminal of the AND gate 231 and also to another input terminal of the AND gate 232.

Consequently, when the replica 22 of the spreading code is a positive code "+1" (logical value "1"), the output from the AND gate 231 becomes "1", whereas when the replica 22 is a negative code "−1" (logical value "0"), the output from the AND gate 232 becomes "0".

When the output from the AND gate 231 becomes "1", the counter 233 counts up, whereas when the output from the AND gate 231 becomes "0", the counter 233 does not count up and maintains the count value. Similarly, when the output from the AND gate 232 becomes "1", the counter 234 counts up, whereas when the output from the AND gate 232 becomes "0", the counter 234 does not count up and maintains the count value.

The count value of the counter 233 is entered into the non-inverting terminal of the adder 236, and the count value of the counter 234 is inputted to the non-inverting terminal of the adder 236 to calculate a difference between both count values.

The calculated difference between the count values is inputted into the D-type flip-flop 237 every time the output of the counter 235 becomes "1", so that the output is maintained. The output of the D-type flip-flop 237 is inputted into the multipliers 24 and 26 shown in FIG. 2, as previously explained above.

As described above, in the DC offset removing circuit of this receiving apparatus, the DC offset of the reception data after being de-spread is removed in response to the code balance of the de-spreading code. Then, in the DC offset removing circuit, the symbol "+" of the spreading code and the symbol "−" of this spreading code are first counted respectively in synchronism with the clock equivalent to the chip rate of the spreading code, and the difference between these count values for each symbol of the spreading code is used as the measurement result of the code balance.

The measurement result is multiplied by the reception signal after being de-spread, the RF component of the multiplied output is removed by the low-pass filter, and then the removed output is multiplied by the measurement result. The DC offset component is removed by subtracting the multiplied output from the reception signal after being de-spread.

Also, since the inventive receiver is so arranged by removing the DC offset component symbol-by-symbol, only the clock equivalent to the chip rate of the spreading code sequence is required within the positive/negative code counter and the clock frequency used in other circuit portions can be lower than that of the conventional apparatus. Accordingly, the power consumption can be reduced without requiring high-speed, high-power consumption, semiconductor elements.

Furthermore, in the conventional circuits, only the predicted DC offset components could be removed. In contrast, since the difference between the positive code and the negative code of the spreading code sequences is measured in each symbol of the received data, the DC offset components for the respective symbols are predicted and can be removed even when the code balance of the spreading code is varied symbol-by-symbol when the spreading codes are different with respect to the symbols, or when the repetition period of the spreading code is longer than one symbol period of the received data.

Since the present receiving apparatus is arranged by removing the DC offset component occurring after the A/D conversion, the DC offset component occurring in the A/D converter can be removed. Further, instead of the low-pass filter operating at a chip clock frequency, an averaging circuit for calculating an average value between the number of "+" of the spreading code, and the number of "−" thereof may be alternatively employed to remove the DC offset.

Thus, with the present invention, the DC offset is removed in response to the code balance of the de-spreading codes of the reception data after being de-spread. Accordingly, only the clock equivalent to the chip rate of the spreading code is required within the positive/negative code counter, and thus the power consumption can be reduced without requiring the high-speed, high-power consumption, semiconductor elements of the conventional circuits.

Also, the code balance of the de-spreading code is measured every one symbol (e.g., for each symbol), and then the DC offset is removed by employing this measured code balance (or more aptly the imbalance). Consequently, even when the spreading code is varied in symbol-by-symbol, the DC offset component contained in the baseband signal can be reliably and affirmatively removed.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A Code-Division-Multiple-Access (CDMA) receiving apparatus for de-spreading a received data signal, comprising:
   means for de-spreading said received data signal with a de-spreading code; and
   offset removing means for removing a direct current (DC) offset in the received data signal de-spread by said de-spreading means based on a calculated code characteristic of said de-spreading code, wherein said code characteristic includes a code imbalance, and wherein said offset removing means comprises:
   a calculator for calculating the code imbalance of said de-spreading code; and
   a first multiplier for multiplying said code imbalance with said received data signal after said received data signal has been de-spread;
   a low-pass filter for removing a high frequency component from said received data signal;
   a second multiplier for multiplying an output from said low-pass filter by said code imbalance; and
   a subtractor for subtracting an output from said second multiplier from said received data signal after said received data signal has been de-spread.

2. A CDMA receiving apparatus as claimed in claim 1, wherein said calculator comprises:
   first and second counters for counting a first code and a second code of said spreading code, respectively, in synchronism with a clock corresponding to a chip rate of said de-spreading code; and
   a subtraction circuit for outputting a difference between a count value of said first counter and a count value of said second counter for every chip in said de-spreading code.

3. A CDMA receiving apparatus as claimed in claim 2, wherein said first code comprises a positive code and said second code comprises a negative code.

4. A CDMA receiving apparatus as claimed in claim 2, wherein the repetition period of said de-spreading code is N ("N" being an integer no less than 2) times of one chip of said spreading code.

5. A direct current (DC) offset removing circuit for removing a DC offset component from received data transmitted by a spread-spectrum technique, comprising:
   a counter for receiving a de-spreading code and calculating an imbalance for each chip in said de-spreading code, wherein said imbalance corresponds to a DC offset in said received data;
   an adder for receiving said received data transmitted by a spread-spectrum technique at a first input, after said received data has been de-spread; and
   a loop feeding to a second input of said adder, said loop comprising:
   a first multiplier connected to an output of said counter for multiplying one of an output of said adder and said received data signal by said imbalance;
   a filter connected to an output of said first multiplier for removing a predetermined component from an output of said first multiplier; and
   a second multiplier connected to an output of said counter for multiplying an output of said filter by said imbalance,
   wherein an output of said second multiplier in said loop connects to said second input of said adder to subtract a DC offset from said received data.

6. A direct current (DC) offset removing circuit as recited in claim 5, wherein said loop comprises a feedback loop for multiplying said output of said adder by said imbalance.

7. A direct current (DC) offset removing circuit as recited in claim 5, wherein said loop comprises a feed-forward loop for multiplying said received data by said imbalance,
   said circuit further comprising a delay element for receiving said received data and for outputting said received data signal a predetermined time after receipt thereof to said first input of said adder.

8. A direct current (DC) offset removing circuit as recited in claim 5, wherein said first input comprises a non-inverting input and said second input comprises an inverting input, and wherein said filter comprise a low-pass filter for removing a high frequency component from said output of said first multiplier.

9. A direct current (DC) offset removing circuit as recited in claim 8, wherein said counter comprises a positive/negative counter, said positive/negative counter comprising:
   a first counter for counting positive chips of said de-spreading code;

a second counter for counting negative chips of said de-spreading code; and a subtractor, connected to said first counter and said second counter, for selectively indicating one of a positive and negative balance for each chip in said de-spreading code.

10. A direct current (DC) offset removing circuit as recited in claim 9, wherein said positive/negative counter further comprises:

a clock having a frequency corresponding to a chip rate of said de-spreading code;

a latch connected to the output of said subtractor; and a third counter connected to said clock, said third counter for clocking said latch according to said chip rate.

11. A direct current (DC) offset removing circuit as recited in claim 10, wherein said latch comprises a D-type flip-flop.

12. A direct current (DC) offset removing circuit as recited in claim 10, wherein said positive/negative counter further comprises:

a first logic gate connected to said first counter for detecting positive chips; and a second logic gate connected to said second counter for detecting negative chips.

13. A direct current (DC) offset removing circuit as recited in claim 12, wherein said first logic gate comprises a first AND gate having a first input connected to said clock and a second input connected to receive said de-spreading code, and wherein said second logic gate comprises a second AND gate having a first input connected to said clock and a second inverting input connected to receive said de-spreading code.

14. A direct current (DC) offset removing circuit as recited in claim 5, wherein said spread-spectrum technique comprises Code Division Multiple Access (CDMA).

15. A method for removing a direct current (DC) offset from received data transmitted by a spread-spectrum technique, comprising steps of:

calculating a chip imbalance from a de-spreading code for each chip in said de-spreading code;

multiplying said received data by said imbalance to modify said received signal according to a first DC offset attributed to an imbalance in said de-spreading code;

removing a high frequency component from said received data;

multiplying said received data, after removing said high frequency component, by said imbalance to modify said received signal according to a second DC offset, to produce a modification signal; and subtracting said modification signal from said received data to produce a data signal free of said first DC offset and said second DC offset.

16. A method for removing a direct current (DC) offset from received data as recited in claim 15, wherein said second DC offset is attributed to conversions between analog and digital formats, wherein said modification signal comprises one of a feed-back signal and a feed-forward signal, and wherein said step of calculating a chip imbalance from a de-spreading code comprises steps of:

counting each occurrence of a positive chip in said de-spreading code;

counting each occurrence of a negative chip in said de-spreading code; and subtracting said each occurrence of a positive chip from said each occurrence of a negative chip to produce said chip imbalance.

17. A method for removing a direct current (DC) offset from received data as recited in claim 16, further comprising steps of:

logically ANDing each chip in said de-spreading code with a clock having a frequency corresponding to a chip rate to detect a positive chip; and logically ANDing the complement of each chip in said de-spreading code with said clock to detect a negative chip.

18. A method for removing a direct current (DC) offset from received data as recited in claim 17, further comprising a step of:

latching a result of said subtraction step in accordance with said chip rate to produce said chip imbalance.

19. A method for removing a direct current (DC) offset from received data as recited in claim 15, further comprising a step of:

generating said de-spreading code which comprises a replica of a spreading code used in a transmission of said received data.

20. A method for removing a direct current (DC) offset from received data as recited in claim 19, wherein said de-spreading code comprises a Code Division Multiple Access (CDMA) code.

* * * * *